United States Patent [19]

Kuzuya et al.

[11] Patent Number: 5,069,557

[45] Date of Patent: Dec. 3, 1991

[54] DEVICE FOR FEEDING RECORDING MEDIUM IN THE LONGITUDINAL RECORDING DIRECTION

[75] Inventors: Susumu Kuzuya, Gifu; Seiji Shimizu; Mikio Kato, both of Nagoya; Yujiro Ishikawa, Toyota; Takashi Sakai, Nagoya; Eiji Yuki, Owariasahi, all of Japan

[73] Assignee: Brother Kogyo Kabushiki Kaisha, Aichi, Japan

[21] Appl. No.: 524,012

[22] Filed: May 16, 1990

Related U.S. Application Data

[62] Division of Ser. No. 271,085, Nov. 14, 1988, Pat. No. 4,976,558.

[30] Foreign Application Priority Data

Nov. 19, 1987 [JP] Japan ............................... 62-292729
Mar. 15, 1988 [JP] Japan ............................... 63-34269

[51] Int. Cl.[5] ........................ B41J 3/20; B32B 31/00

[52] U.S. Cl. ............................ 400/120; 156/277; 400/636

[58] Field of Search ........................ 400/636, 605–611, 400/615.1, 120; 101/226, 228; 156/277; 364/469, 471; 493/321

[56] References Cited

U.S. PATENT DOCUMENTS

| | | | |
|---|---|---|---|
| 357,921 | 2/1987 | Hamilton . | |
| 1,973,589 | 9/1934 | Watson . | |
| 2,205,980 | 6/1940 | Keller et al. | 156/277 |
| 2,254,299 | 9/1941 | Ledger et al. . | |
| 2,302,179 | 11/1942 | Bronfman | 156/277 |
| 2,366,022 | 12/1944 | Handley . | |
| 3,024,155 | 3/1962 | Huber | 156/277 |
| 3,322,605 | 5/1967 | Frech | 156/277 |
| 3,572,601 | 3/1971 | Miller . | |

(List continued on next page.)

FOREIGN PATENT DOCUMENTS

| | | | |
|---|---|---|---|
| 116382 | 8/1984 | European Pat. Off. . | |
| 2383871 | 11/1978 | France | 156/277 |
| 46-25843 | 9/1971 | Japan . | |
| 51-11611 | 1/1976 | Japan . | |
| 54-51610 | 4/1979 | Japan . | |
| 56-53420 | 12/1981 | Japan . | |
| 57-41961 | 3/1982 | Japan . | |
| 0102380 | 6/1982 | Japan | 156/277 |
| 39578 | 3/1984 | Japan . | |
| 165246 | 8/1985 | Japan . | |
| 61-31260 | 2/1986 | Japan . | |
| 61-1480647 | 7/1986 | Japan . | |
| 61-202852 | 9/1986 | Japan . | |
| 2036643 | 7/1980 | United Kingdom | 156/277 |

*Primary Examiner*—Eugene H. Eickholt
*Attorney, Agent, or Firm*—Oliff & Berridge

[57] ABSTRACT

A feeding device for feeding a recording medium having a predetermined printing area on one of its opposite surfaces. The printing area extends in a printing direction. The feeding device includes a pair of feed rollers which holds the medium therebetween in rolling contact with the opposite surfaces of the medium. At least one of the pair of feed rollers is driven so as to rotate about an axis perpendicular to the printing direction, to feed the medium in the printing direction. One of the feed rollers which contacts the above-indicated one surface of the medium has an outer circumferential surface which includes a small-diameter portion whose diameter is smaller than that of the other portions. The small-diameter portion is aligned with the printing area in a direction of width of the medium perpendicular to the printing direction, so that the small-diameter portion is prevented from contacting the printed image. The feed rollers may be replaced by a platen roller of a printer. The platen roller is rotated about an axis perpendicular to the printing direction, and cooperates with a print head of the printer to hold and feed the recording medium such that the platen roller and the print head contact the opposite surfaces of the medium. This arrangement also protects the printed image from an adverse influence by a feeding action of the feeding device.

6 Claims, 9 Drawing Sheets

U.S. PATENT DOCUMENTS

| | | | |
|---|---|---|---|
| 3,583,540 | 6/1971 | Bernard . | |
| 3,587,810 | 6/1971 | Alper . | |
| 3,607,519 | 9/1971 | Beyer et al. | 156/277 |
| 3,664,481 | 5/1972 | Dreimanis et al. . | |
| 3,768,619 | 10/1973 | Lewis . | |
| 3,854,229 | 12/1974 | Morgan . | |
| 3,954,261 | 5/1976 | Greene et al. . | |
| 4,078,485 | 3/1978 | Guthrie . | |
| 4,243,330 | 1/1981 | Wallace et al. . | |
| 4,299,637 | 11/1981 | Oberde et al. | 156/277 |
| 4,384,912 | 5/1983 | Jannssen | 156/277 |
| 4,504,837 | 3/1985 | Toyoda et al. . | |
| 4,544,289 | 10/1985 | McGourty et al. . | |
| 4,548,523 | 10/1985 | McGourty et al. . | |
| 4,564,411 | 1/1986 | Holzer . | |
| 4,568,951 | 2/1986 | Hasegawa et al. . | |
| 4,595,305 | 6/1986 | McGourty et al. . | |
| 4,611,936 | 9/1986 | Yasui . | |
| 4,625,218 | 11/1986 | Watanabe | 400/120 |
| 4,650,350 | 3/1987 | Dorner | 400/120 |
| 4,652,164 | 3/1987 | Horiya et al. . | |
| 4,661,001 | 4/1987 | Takai et al. . | |
| 4,686,834 | 5/1987 | Hachisuga et al. . | |
| 4,690,720 | 9/1987 | Mack | 156/277 |
| 4,697,558 | 10/1987 | Sakura et al. | 400/120 |
| 4,699,381 | 6/1987 | Nakajima . | |
| 4,699,531 | 10/1987 | Ulinsni, Sr. et al. . | |
| 4,741,633 | 5/1988 | Shibuya et al. | 400/120 |
| 4,750,880 | 6/1988 | Stephenson et al. | 400/120 |
| 4,793,724 | 12/1988 | Battles . | |
| 4,818,126 | 4/1989 | Brooks et al. . | |
| 4,839,742 | 6/1989 | Nakatawh et al. | 400/120 |
| 4,844,770 | 7/1989 | Shiraishi et al. . | |
| 4,917,010 | 4/1990 | Gilham et al. | 400/120 |
| 4,982,202 | 1/1991 | Buan et al. | 400/120 |
| 4,997,378 | 9/1991 | Shima | 400/120 |

DEVICE FOR FEEDING RECORDING MEDIUM IN THE LONGITUDINAL RECORDING DIRECTION

This is a division of application Ser. No. 07/271,085 filed Nov. 14, 1988 now U.S. Pat. No. 4,976,558.

BACKGROUND OF THE INVENTION

1. Field of the Invention

The present invention relates in general to a printing apparatus wherein printing is effected on a recording medium while the medium is fed in a direction of printing, and more particularly to a feeding device having a driving feed roller for feeding the recording medium such that the feed roller is in rolling contact with a surface of the medium.

2. Discussion of the Prior Art

In a printing apparatus of the type indicated above, the recording medium is fed in the printing direction in which the recording medium is moved relative to a print head. In a known printing apparatus of this type, a pair of feed rollers are usually provided to feed the recording medium in the printing direction such that the feed rollers are adapted to be held in rolling contact with the opposite surfaces of the recording medium and are rotated about respective axes perpendicular to the printing direction.

Usually, the recording medium used for this printing apparatus takes the form of a web or tape, which is fed in its longitudinal direction so that desired lettering characters or graphic designs are printed in a predetermined printing area which extends in the longitudinal direction of the medium. The printed portion of the tape or web which bears desired images is cut off and is used as a dry image transfer sheet or decalcomania sheet, for which the images are transferred to a desired image-receptive member.

While dry transfer sheets for lettering purposes are commercially available, the users are often forced to buy the dry transfer sheets which include letterings or graphic designs other than those which are desired or needed by the users. If the image to be transferred consists of a word, for example, the users are required to transfer the individual letters of the word from a dry transfer sheet or sheets, one after another, while registering the transferred letters.

In view of the disadvantages of the commercially available dry transfer sheets, there has been proposed a printing apparatus of the type described above, by which the users can prepare dry transfer sheets which bear desired original images such as words, phrases or graphic designs to be transferred to a desired image-receptive member. For instance, Japanese Patent Application No. 61-305539 discloses a thermal tape printer. In this thermal printer, a thermal print ribbon is superposed on a recording tape which has a specially processed recording surface. Printing is effected on the recording surface of the tape, such that an ink composition is transferred from the thermal print ribbon to the recording surface of the tape, by selective energization of heat-generating elements of the print head. Thus, a desired lettering tape or dry transfer tape which bears an image formed by the transferred ink composition is prepared by thermal mass transfer printing. The prepared dry transfer tape is placed on the desired image-receptive member, and a finger-pressure is applied to the back of the tape to transfer the image from the dry transfer tape to the surface of the image-receptive member.

As indicated above, the recording tape is fed in the printing direction by a pair of feed rollers, which are disposed downstream of the print head in the printing direction. On the other hand, the recording surface of the tape has a relatively low degree of wettability, for easy transfer of the printed image from the recording tape to the image-receptive member. Accordingly, the printed image tends to be easily transferred to the outer circumferential surface of one of the two feed rollers which is held in rolling contact with the recording surface of the tape while the tape is fed. This indicates partial or complete removal or erasure of the printed image from the prepared dry transfer tape, and re-transferring of the ink composition from the feed roller to the printing area on the recording surface of the printed tape.

A similar drawback is experienced where the tape printer is used for printing desired images on a recording medium which is not used as a dry transfer sheet. For example, the printed recording medium is directly applied by an adhesive to a desired article. While the recording surface of the medium used in this case has a relatively high degree of wettability, the printed images on the medium is more or less adversely influenced by the contact of the feed roller with the recording surface of the medium.

SUMMARY OF THE INVENTION

It is therefore an object of the present invention to provide a feeding device for a printing apparatus, which is capable of feeding a recording medium in the printing direction, without adversely influencing an image printed on the recording surface of the medium.

The above object may be attained according to one aspect of the present invention, which provides a feeding device having a pair of feed rollers for feeding a recording medium which bears a printed image on one of opposite surfaces thereof. The pair of feed rollers hold the recording medium therebetween in rolling contact with the opposite surfaces. At least one of the feed rollers is driven so as to rotate about an axis perpendicular to a printing direction in which the image is printed in a predetermined printing area, whereby the recording medium is fed in a feeding direction parallel to said printing direction in which the predetermined printing area extends. One of the pair of feed rollers which contacts the above-indicated one surface of the recording medium has an outer circumferential surface which includes a small-diameter portion whose outside diameter is smaller than that of the other portions. The small-diameter portion is aligned with the predetermined printing area in a direction of width of the recording medium perpendicular to the feeding and printing directions, whereby the small-diameter portion of the above-indicated one feed roller is prevented from contacting the printed image.

In the feeding device of the present invention constructed as described above, the outer circumferential surface of the feed roller which contacts the recording surface of the medium has a portion whose outside diameter is smaller than the other portions. Since this small-diameter portion is aligned with the predetermined printing area on the recording surface of the medium, the medium is fed by the feed rollers such that the small-diameter portion of the relevant feed roller is kept away from the printing area of the medium.

Namely, only the other portions of the outer surface of the relevant feed roller contact the recording surface of the medium. Thus, the outer circumferential surface of the relevant feed roller is prevented from contacting the predetermined printing area on the recording surface of the medium, and the printed image is thereby protected against an adverse influence due to contact with the feed roller which contacts the recording surface of the medium.

In one form of the feeding device of the invention, one of the pair of feed rollers comprises two radially outwardly extending guide flanges which are spaced apart from each other in the direction of width of the recording medium, by a distance slightly larger than a width of the recording medium. The other feed roller has an axial length slightly smaller than the distance so that the other feed roller is positioned between the two guide flanges.

Another object of the invention is to provide a tape cassette for a printing apparatus, which is suitable for delivering a recording tape in the printing direction, without an adversely influencing image printed on the recording surface of the tape.

The above object may be accomplished according to another aspect of the invention, which provides a tape cassette comprising: a cassette casing including an open portion exposed to an external space; a tape supply portion disposed within the cassette casing, for delivering a recording tape on which printing is effected; a ribbon supply portion disposed within the cassette casing, for delivering a print ribbon used for printing on the recording tape; a ribbon take-up portion disposed within the cassette casing, for receiving a used length of the print ribbon; a tape/ribbon guide for guiding the recording tape and the print ribbon delivered from the tape supply and ribbon supply portions, respectively, such that the tape and ribbon are superposed on each other, and until the superposed tape and ribbon reach the open portion of the cassette casing, the tape/ribbon guide separating the print ribbon from the recording tape and directing the print ribbon to the ribbon take-up portion, after the superposed tape and ribbon have reached the open portion of the cassette casing; and a feed roller rotatably supported by the cassette casing, for rolling contact with one of opposite surfaces of the recording tape which has been in contact with the print ribbon, after the recording tape and the print ribbon have reached the open portion of the cassette casing. The feed roller has an outer circumferential surface which includes a small-diameter portion whose outside diameter is smaller than that of the other portions so that the small-diameter portion is prevented from contacting the recording tape.

The tape cassette according to the present invention is also capable of protecting the printed image on the recording tape against an adverse influence due to contact with the feed roller.

In one form of the tape cassette of the invention, the open portion of the cassette casing has a cutout adjacent to the tape/ribbon guide. The cutout accommodates a print head which is disposed on a printing apparatus to which said tape cassette is removably mounted such that said print head acts on the recording tape via the print ribbon. According to one arrangement of this form of the tape cassette, the cutout is U-shaped, and the tape/ribbon guide comprises a U-shaped wall which extends from a periphery of the U-shaped cutout and which includes two opposed arm portions. One of the two opposed arm portions has an end for guiding the superposed tape and ribbon, while the other arm portion has an end for guiding only the ribbon which has been separated from the tape A third object of the present invention is to provide a printing apparatus wherein a recording medium is fed in the printing direction by a pair of feed rollers, without an adverse influence on an image printed on the recording surface of the medium.

This object may be achieved according to a further aspect of the present invention, which provides a printing apparatus comprising: a medium supply device for delivering a recording medium on which printing is effected; a printing device for printing in a predetermined printing area on one of opposite surfaces of the recording medium; and a first and a second feed roller for holding the recording medium therebetween in rolling contact with opposite surfaces of the medium, after the medium has passed the printing device. The first and second feed rollers are adapted to rotate to feed the medium, while the first feed roller contacts the above-indicated one or recording surface of the medium. The first feed roller has an outer circumferential surface which has a small-diameter portion whose outside diameter is smaller than that of the other portions. The small-diameter portion is aligned with the predetermined printing area in a direction perpendicular to a direction of feed of the medium, whereby the small-diameter portion of the first feed roller is prevented from contacting the predtermined printing area of the one surface of the recording medium. This printing apparatus has the same advantages as described above with respect to the feeding device and the tape cassette of the invention.

In one form of the printing apparatus of the invention, the printing device comprises a ribbon supply device for delivering a print ribbon, a guide for guiding the recording medium and the print ribbon in a longitudinal direction thereof such that the medium and ribbon are superposed on each other, a platen for supporting the superposed medium and ribbon on the side of the medium, and a print head which acts on a portion of the ribbon supported by the platen, for effecting printing on the predetermined printing area of the medium. The platen may be a platen roller rotatable about an axis perpendicular to the direction of feed of the recording medium. In this case, the printing apparatus may further comprise a roller holder for supporting the platen roller and the second feed roller, first biasing means and second biasing means. The roller holder is adapted to be movable such that the platen roller and the second feed roller are movable toward and away from the print head and the first feed roller, respectively. The first biasing means biases the roller holder in a direction that causes the platen roller and the second feed roller to move toward the print head and the first feed roller. One of the platen roller and the second feed roller is movable relative to the roller holder in a direction of movement of the platen roller and the second feed roller by the roller holder. The second biasing means is adapted to bias the above-indicated one of the platen roller and the second feed roller relative to the roller holder, in the direction of movement of the platen roller and the second feed roller toward the print head and the first feed roller. A biasing force of the second biasing means is determined to be smaller than that of the first biasing means.

The printing apparatus may preferably include a cutter device for cutting the recording medium after the medium is printed by the printing device.

The third object may also be achieved according to a still further aspect of the invention, which provides a printing apparatus for printing on a recording medium in a predetermine printing direction, comprising a platen roller rotatable about an axis perpendicular to the printing direction, a print head for printing on the recording medium such that the medium is held in contact with the print head and the platen roller, and a platen-roller drive device for rotating the platen roller for feeding the recording medium in the printing direction.

In the instant printing apparatus wherein the platen roller is utilized as part of a feeding device for feeding the recording medium, there exist no other feed rollers which contact the recording surface of the medium. Therefore, the feeding device will not have an adverse influence on an image which is printed on the recording surface of the medium while the medium is held in contact with the print head and the platen roller.

In one form of this aspect of the invention, the printing apparatus further comprises a ribbon supply device for delivering a print ribbon such that the print ribbon is positioned between the recording medium and the print head and is fed together with the recording medium in the printing direction.

In another form of the same aspect of the invention, the printing apparatus further comprises a covering tape supply device for delivering a covering tape for covering one of opposite surfaces of the recording medium on which printing is effected by the print head, and the recording medium consists of a recording tape. In this case, a pair of presser rollers are provided for superposing the covering tape delivered by the covering tape supply device, on a printed length of the recording tape, so as to cover the one surface of the recording tape. The presser rollers define therebetween a pressure nip through which are passed the covering tape and the printed length of the recording tape which have been superposed, whereby the covering tape and the printed length of the recording tape are secured to each other.

In the above form of the invention, the apparatus may further comprise a presser-roller drive device for driving at least one of the presser rollers for feeding the recording tape in the printing direction, and a drive control device connected to the platen-roller drive device and the presser-roller drive device, for seletively operating the platen-roller drive device and the presser-roller drive device.

In the same form of the invention, the presser rollers may have an operated position in which the pressure nip is established, and a non-operated position in which the presser rollers are spaced apart from each other. In this instance, the platen-roller drive device and the presser-roller drive device comprises a common drive source, and the drive control device comprises switching means which is selectively placed in a first position for operatively connecting the common drive source to the platen roller and placing the presser rollers in the non-operated position, and a second position for operatively connecting the common drive source to the presser rollers and placing the presser rollers in the operated position.

In a further form of the same aspect of the invention, the printing apparatus further comprises a pair of feed rollers disposed downstream of the platen roller in the printing direction, for feeding the recording medium fed by the platen roller. The feed rolers are adapted to hold the recording medium therebetween in rolling contact with opposite surfaces of the recording medium one of which includes a printing area printed by the print head. The feed rollers are adapted to rotate about respective axes perpendicular to the printing direction. One of the feed rollers which contacts the printed surface having an outer circumferential surface which includes a small-diameter portion whose outside diameter is smaller than that of the other portions, whereby the small-diameter portion of the one feed roller is prevented from contacting the printing area of the recording medium.

BRIEF DESCRIPTION OF THE DRAWINGS

The above and optional objects, features and advantages of the present invention will become more apparent by reading the following detailed description of presently preferred embodiments of the invention, when considered in connection with the accompanying drawings, in which.

DETAILED DESCRIPTION OF THE PREFERRED EMBODIMENTS

Figure 1:
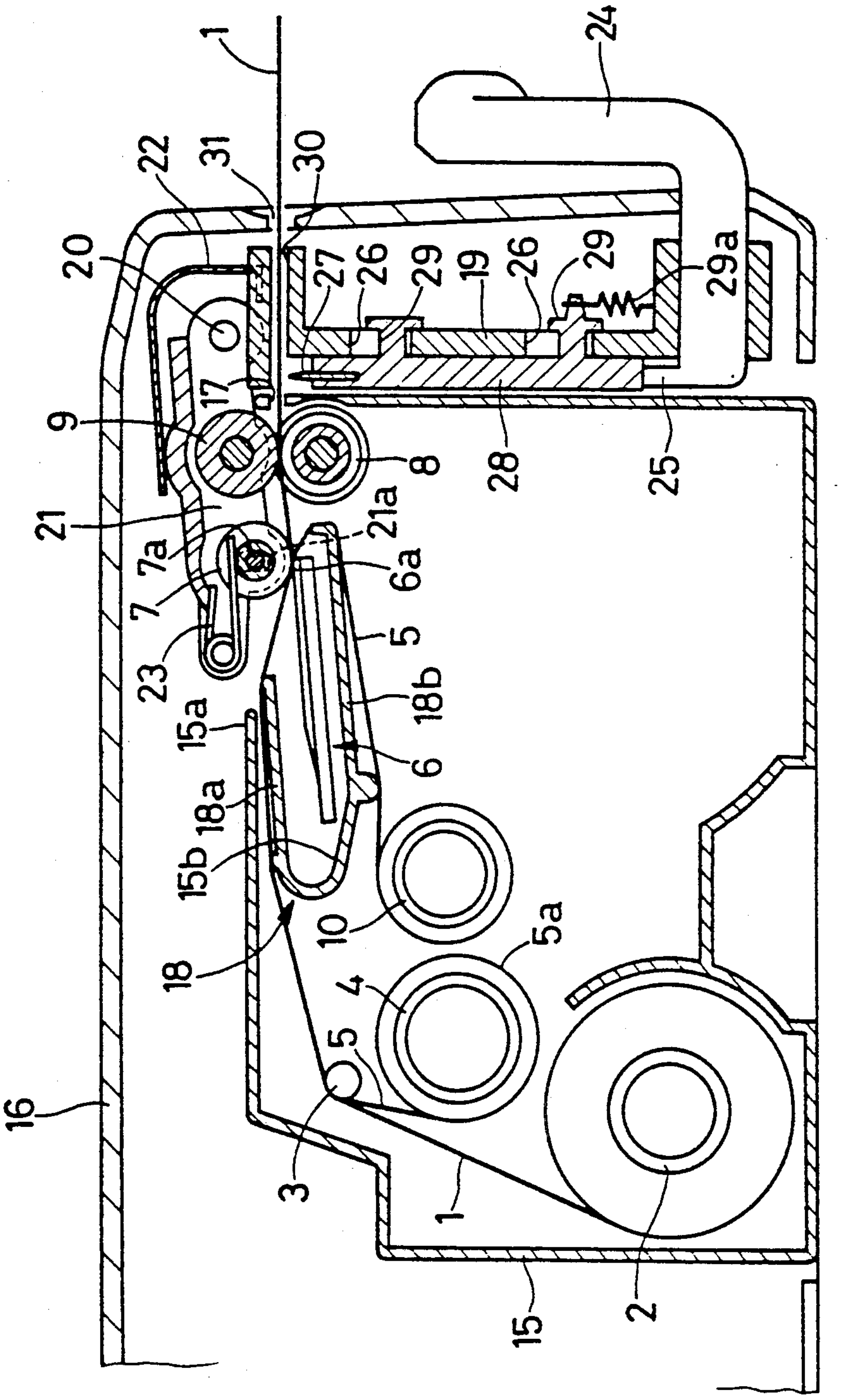
FIG. 1 is a fragmentary elevational view in longitudinal cross section of one embodiment of a printing apparatus of the present invention in the form of a tape printer.
Figure 2:
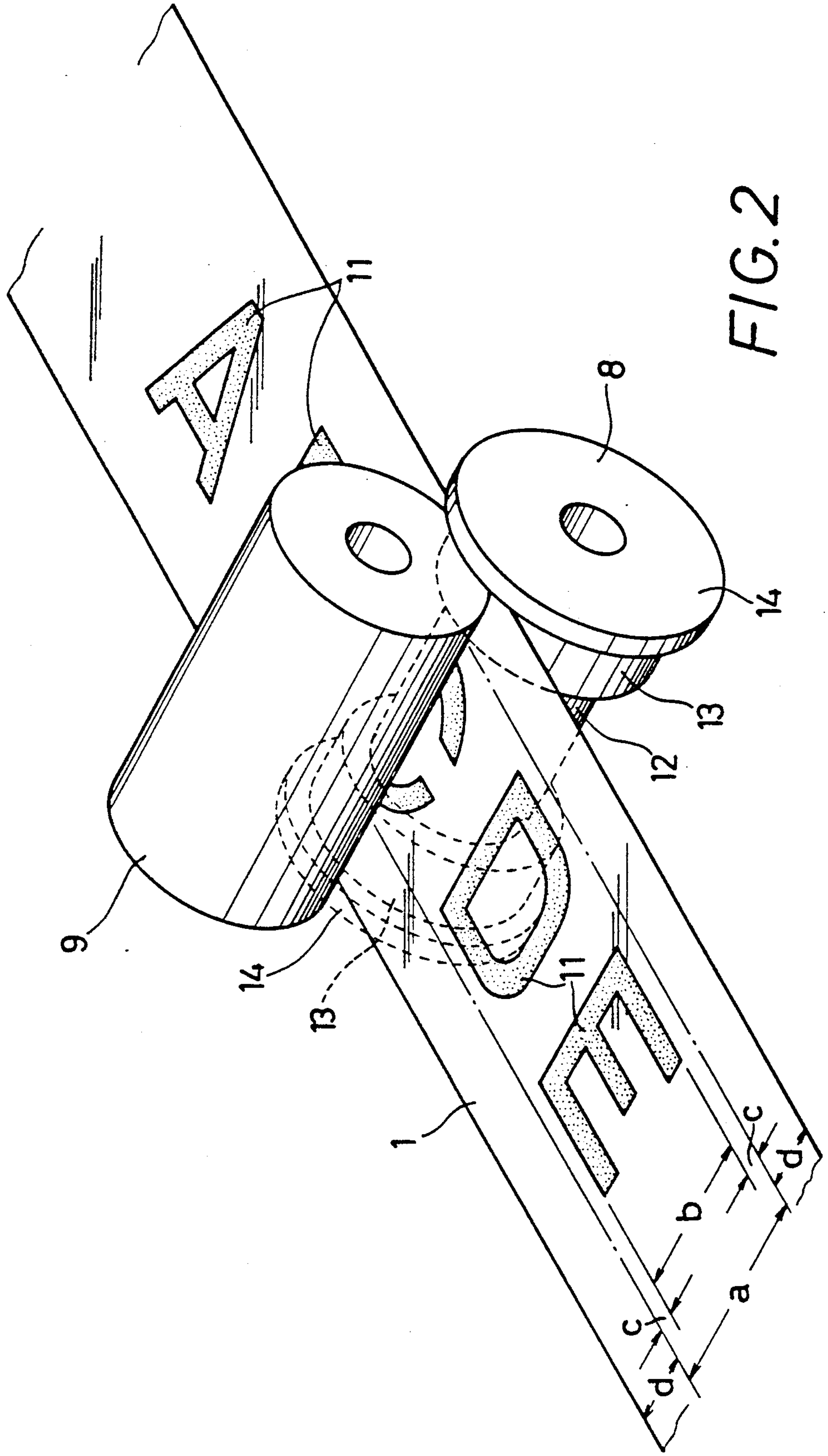
FIG. 2 is a perspective view showing a pair of feed rollers and a recording tape used in the printing apparatus of FIG. 1.

Referring first to FIGS. 1 and 2, there is shown one example of the presently preferred form of the tape printer constructed according to the present invention. In the figures, reference numeral 15 denotes a tape cassette removably mounted on a housing 16 of the printer. The tape cassette 15 accommodates a tape supply spool 2, a ribbon supply spool 4 and a ribbon take-up spool 10 such that these spools 2, 4, 10 are rotatably supported. The tape supply spool 2 has a roll of a recording medium in the form of a transparent web or tape 1, and the ribbon supply spool 4 has a roll of a thermal print ribbon 5. The print ribbon 5 is wound such that an ink layer 5*a* of the ribbon 5 faces radially outwardly of the roll. The take-up spool 10 is adapted to receive a roll of the used length of the print ribbon 5.

The casing of the tape cassette 15 has an opening 15*a* which is open to an external space within the tape printer. Adjacent to this opening 15*a*, there is disposed a thermal print head 6 which has a plurality of heat-generating elements 6*a* arranged in a row.

The transparent tape 1 delivered from the tape supply spool 2 is superposed at a guide pin 3, on the thermal print ribbon 5 supplied from the ribbon supply spool 4. The superposed transparent tape 1 and print ribbon 5 are guided by a generally U-shaped guide member 18, toward the print head 6 adjacent to the opening 15*a* of the cassette 15. The print head 6 is accommodated within the guide member 18. Described more specifically, the casing of the tape cassette 15 has a generally U-shaped cutout 15*b* formed in its bottom wall. The guide member 18 extends from the periphery of the cutout 15*b* so as to surround the print head 6.

The U-shaped guide member 18 has two opposed arm portions 18*a*, 18*b*. The superposed transparent tape and print ribbon 1, 5 are guided by the arm portion 18*a* between the guide pin 3, and the working portion of the print head 6 provided at its one end adjacent to the opening 15*a*, such that the print ribbon 5 slidably contacts the arm portion 18*a*.

Adjacent to the working portion of the print head 6 at which the heat-generating elements are disposed, there is disposed a platen roller 7 which cooperates with the print head 6 to hold therebetween the superposed transparent tape 1 and print ribbon 5, under a suitable amount of pressure. With the heat-generating elements of the print head 6 selectively energized, the corresponding local areas of the ink layer 5*a* of the print ribbon 5 are thermally transferred to the mating surface of the transparent tape 1, whereby desired images 11 such as letters, symbols and graphic designs are printed on the transparent tape 1 as indicated in FIG. 2. The printed tape 1 is used as a dry transfer or decalcomania sheet, as described below.

The used length of the print ribbon 5 and the printed length of the transparent tape 1 are separated from each other. The used length of the print ribbon 5 is guided by the other arm portion 18*b* of the guide member 18, toward the ribbon take-up spool 10, and is wound as a roll on the take-up spool 10. On the other hand, the printed length of the transparent tape 1 is passed through a pressure nip of a pair of feed rollers 8, 9. The feed roller 8 is a driving roller, while the other feed roller 9 is a driven roller.

As shown in enlargement in FIG. 2, the images 11 (such as letters "A", "B" and "C") are printed in a predetermined printing area on one of opposite surfaces of the transparent tape 1, i.e., on the lower surface of the tape 1 as viewed in FIG. 2, which is on the side of the print ribbon 5 and the print head 6. The driving feed roller 8 is adapted to contact the non-printing areas of the above-indicated one printing surface of the tape 1.

Stated more particularly, the outer circumferential surface of the driving feed roller 8 has an axially intermediate small-diameter portion 12, and a pair of feeding portions 13 formed adjacent to the opposite ends of the small-diameter portion 12. The small-diameter portion 12 has a smaller outside diameter than the feeding portions 13. The driving feed roller 8 further has a pair of guide flanges 14 which are formed adjacent to the outer ends of the feeding portions 13, so as to extend in the radially outward direction.

The driving and driven feed rollers 8 and 9 are dimensioned such that the length of the driven feed roller 9 is slightly smaller than a distance between the inner surfaces of the guide flanges 14 of the driving feed roller 8, so that the the opposite end faces of the driven feed roller 9 are positioned adjacent to the corresponding inner surfaces of the guide flanges 14 of the driving feed roller 8. The transparent tape 1 has a width substantially equal to the length of the driven feed roller 9, so that the transparent tape 1 is passed through the pressure nip of the two feed rollers 8, 9 such that the tape 1 is suitably guided by the guide flanges 14.

The small-diameter portion 12 has an axial length "a" which is larger than a width "b" of the predetermined printing area on the transparent tape 1, by an amount equal to 2*c*, where "c" is a margin provided on the opposite sides of the printing area, as indicated in FIG. 2. In this arrangement, the lower surface of the transparent tape 1 is fed such that only the opposite edge portions of the tape 1 on the opposite sides of the printing area "b" is in contact with the feeding portions 13 of the driving feed roller 8 which have an axial length "d". Therefore, the small-diameter portion 12 of the driving feed roller 8 is prevented from contacting the printing area "b", namely, prevented from contacting the printed images 11 on the lower surface of the transparent tape 1. The amount of the margins "c" increases with a decrease in the length "d" of each feeding portion 13 of the driving feed roller 8, to thereby reduce the possibility of contact between the feeding portions 13 and the printing area "b". However, the feeding force imparted to the transparent tape 1 decreases with the decrease in the length "d" of the feeding portions 13. Hence, the length "d" of the feeding portions 13 should be larger than a critical value that assures a stable, smooth feeding of the tape 1.

The casing of the tape cassette 15 has a slot 17 formed at a right upper corner thereof as viewed in FIG. 1. This slot 17 is positioned adjacent to and to the right of the pressure nip between the two feed rollers 8, 9, so that the printed length of the transparent tape 1 fed by the feed rollers 8, 9 is passed through the slot 17.

Between the right wall of the cassette 15 through which the slot 17 is formed, and the corresponding right wall of the housing 16 of the tape printer, there is disposed a side frame 19 which generally extends parallel to the right walls of the cassette and housing 15, 16. At an upper end of the side frame 19 as viewed in FIG. 1, a support shaft 20 is provided to pivotally support a roller holder 21, which supports the platen roller 7 and the driven feed roller 9. The roller holder 21 is biased in the counterclockwise direction (in FIG. 1) by a generally L-shaped plate spring 22 which is fixed at its one end to the side frame 19. In this arrangement, the driven feed roller 9 and the platen roller 7 are normally held in pressed contact with the driving feed roller 8 and the print head 6, respectively.

The roller holder 21 has an elongate hole 21*a* formed therein so as to extend in its pivoting direction, so that a shaft 7*a* of the platen roller 7 is movable in the elongate hole toward and away from the print head 6. The roller holder 21 has a torsion spring 23 for biasing the platen roller 7 toward the print head 6. The biasing force of this torsion spring 23 is smaller than that of the plate spring 22. Thus, the platen roller 7 is held in pressed contact with the thermal print head 6, under a suitable pressure, as shown in FIG. 1, while printing is effected. The driven feed roller 9 and the platen roller 7 may be moved away from the driving feed roller 8 and the print head 6, by pivoting the roller holder 21 in the clockwise direction.

The tape printer is provided with a cutter lever 24 which is pivotally supported by a lower end portion of the side frame 19 (as seen in FIG. 1), such that a free end of the cutter lever 24 is positioned outside the printer for manipulation by the user of the printer, while a fixed end of the lever 24 is formed with a cam portion 25 disposed between the side frame 19 and the right wall of the casing of the tape cassette 15. The side frame 19 has two elongate holes 26, 26 formed through its intermediate portion. A cutter holder 28 is movably supported by the side frame 19 such that two screws 29 threaded in the cutter holder 28 extend through the elongate holes 26, as indicated in FIG. 1. The cutter holder 28 is positioned between the side frame 19 and the right wall of the cassette 15, and is biased in the downward direction (in FIG. 1) by a tension spring 29*a* so that the lower end of the cutter holder 28 is held in abutting contact with the cam portion 25 of the cutter lever 24. The cutter holder 28 has a cutting blade 27 fixed at its upper end adjacent to the feed path of the transparent tape 1. With the cutter lever 24 operated, the rotated cam portion 25 causes the cutter holder 28 to move with the cutting blade 27, toward and away from the feed path of the tape 1, in order to cut the used length of the tape 1 after the tape 1 has passed through the slot 17.

The side frame 19 further has a guide aperture 30 aligned with the slot 17, and the housing 16 of the printer has a tape outlet 31 aligned with the guide aperture 30, so that the slot 17, guide aperture 30 and tape outlet 31 define the feed path of the tape 1, along which a segment of the tape 1 cut by the blade 27 is ejected out of the housing 16 of the printer. This segment of the printed tape 1 is used as a dry transfer or decalcomania sheet for transferring the printed image to a desired image receptor member.

There will be described an operation of the instant tape printer.

Thermal printing of the images 11 on the lower surface of the transparent tape 1 is effected while the superposed tape 1 and print ribbon 5 are held in pressed contact with each other between the platen roller 7 and the print head 6, and fed by the feed rollers 8, 9 and the take-up spool 10. The printed length of the transparent tape 1 is fed such that the edge portions of the tape 1 is held in rolling contact with the feeding portions 13 of the driving feed roller 8, while the printing area "b" or printed images 11 in the printing area is held apart from the axially intermediate small-diameter portion 12 of the driving feed roller 8. Thus, the outer circumferential surface of the driving feed roller 8 is prevented from contacting the printed images 11 in the predetermined printing area "b".

In the present tape printer, the ink composition forming the printed images 11 will not be transferred from the transparent tape 1 to the surface of the driving feed roller 8. Thus, the instant tape printer is free of otherwise possible inconveniences experienced in the conventional tape printer, such as complete or partial erasure of the printed images 11, soiling of the driving feed roller 8 with the ink material transferred thereto, and re-transfer of the ink material from the driving feed roller 8 back to the transparent tape 1.

Further, the feeding portions 13 of the driving feed roller 8 and the driven feed roller 9 cooperate with each other to stably and smoothly feed the printed length of the transparent tape 1. Furthermore, the guide flanges 14, 14 radially outwardly extending from the opposite axial ends of the driving feed roller 8 serve to guide the transparent tape 1 along the predetermined path, while preventing the driven feed roller 9 and the tape 1 from moving in the axial direction of the rollers 8, 9 perpendicular to the tape feeding direction, and thereby preventing the printed images 11 from contacting the feeding portions 13 of the driving feed roller 8.

Figure 2A:
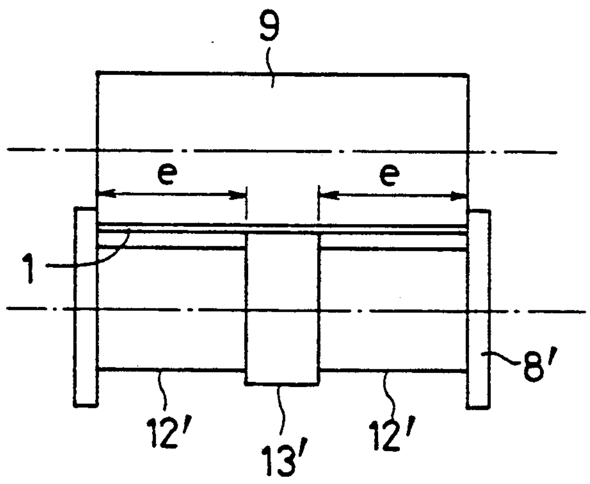
FIG. 2A is a schematic elevation view showing another form of the feed roller arrangement.

While the instant tape printer is adapted to print in the single printing area "b", it is possible that printing is effected in two or more parallel printing areas or zones e parallel to the feeding direction of the tape 1 as indicated in FIG. 2A. In this case, the driving feed roller 8 is, provided with a plurality of small-diameter portion 12' aligned with the printing areas. These small-diameter portions are spaced apart from each other in the direction of, width of the tape 1, and a large-diameter feeding portion 13' is provided between the adjacent small-diameter portions.

While the instant tape printer is adapted to produce a dry transfer sheet by thermal mass transfer printing by using the thermal print head 6 and the thermal print ribbon 5, a similar dry transfer sheet may be produced by an other suitable printing method, provided that the images formed on the recording medium may be suitably transferred to a desired image receptive member. Further, the transparent tape 1 used as the recording medium may be replaced by cut sheets delivered from a suitable delivery device, and the recording medium need not be transparent.

Figure 3:
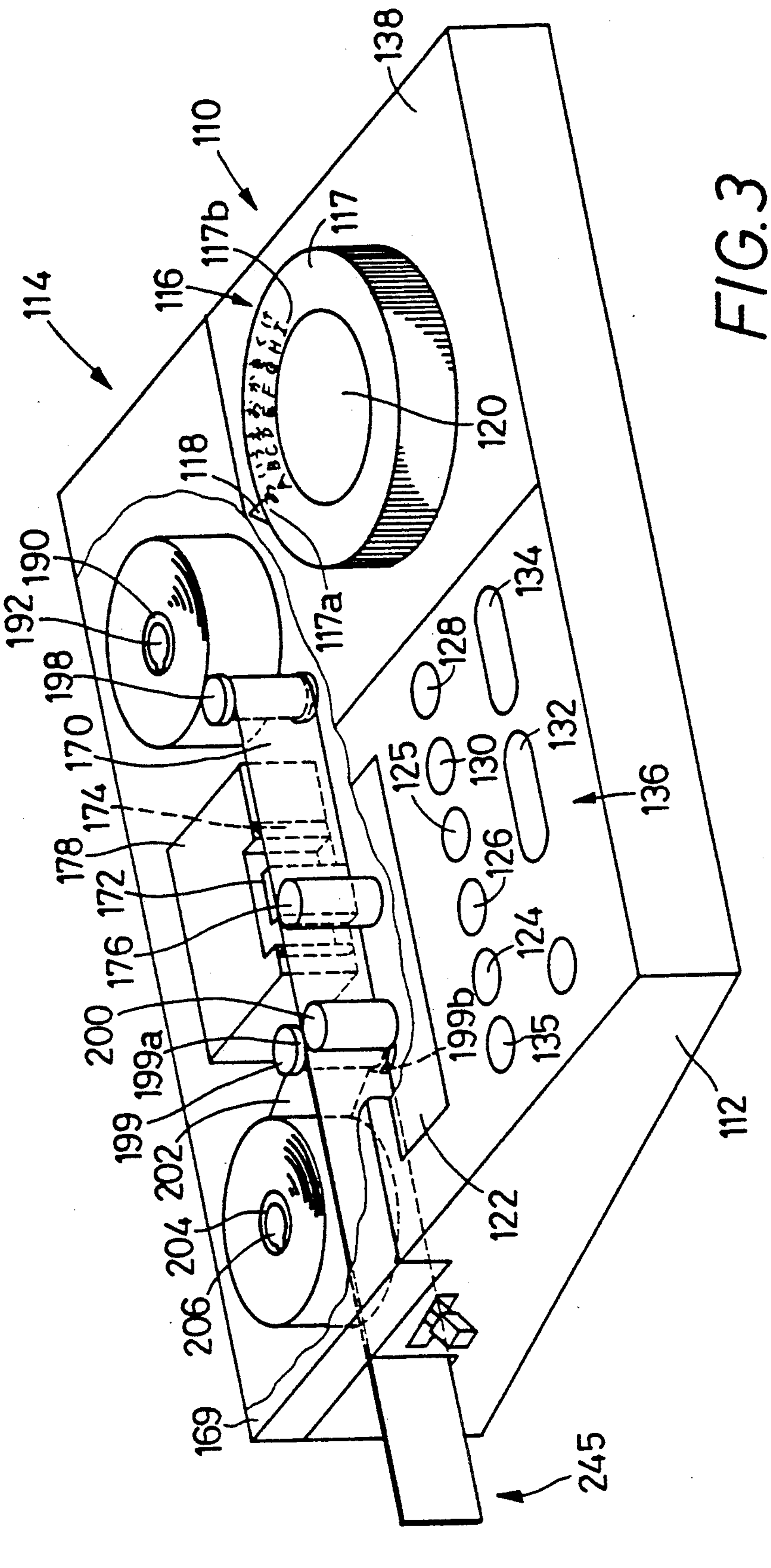
FIG. 3 is a perspective view of another embodiment of the printing apparatus of the invention, also in the form of a tape printer.
Figure 4:
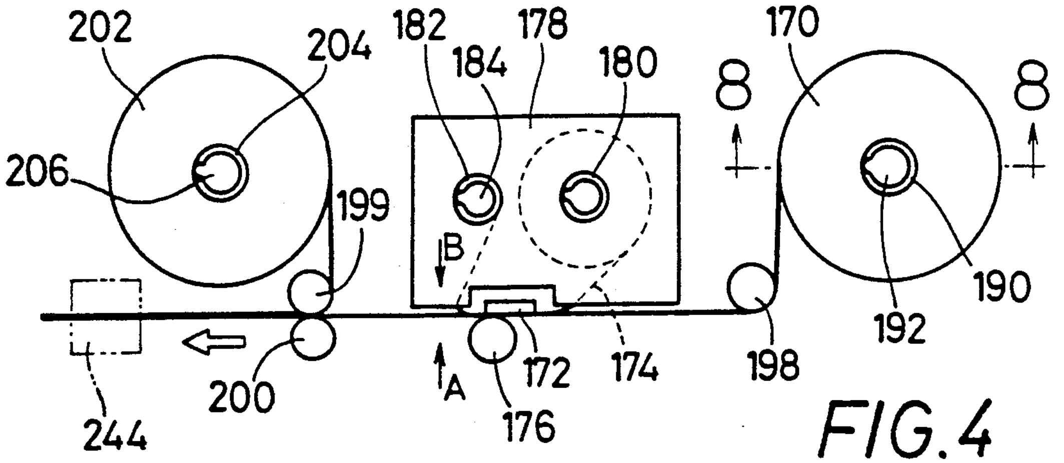
FIG. 4 is a fragmentary schematic plan view of the tape priner of FIG. 3.

Referring first to FIGS. 3 and 4, there is shown a general arrangement of a tape printer according to a modified embodiment of the invention. The tape printer has an apparatus body 112 which consists of a front section incorporating a data input section 110, and a rear section incorporating a printing section 114 adapted to effect printing according to input data entered through the data input section 110. The data input section 110 has a data entry member in the form of a character entry dial 116 which is rotatable to enter desired characters to be printed. The character entry dial 116 assumes an annular shape, and has an annular indicator surface 117 on which are provided two circular rows 117*a*, 117*b* of indicia such that the indicia of each row 117*a*, 117*b* are equally spaced apart from each other along the annulus of the indicator surface 117. The indicia represent a multiplicity of characters such as letters (Japanese "kana" letters, English alphabetic letters and numerals), symbols and graphic representations. The present tape printer is adapted to selectively print Japanese and Chinese characters, as well as English letters.

The data input section 110 further has a pointer 118 disposed adjacent to the outer circumference of the character entry dial 116. The pointer 118 is used to zero the dial 116, and position the dial 116 for selecting the desired character. Inside the character entry dial 116, there is concentrically disposed a CONFIRMATION key 120 which is operated to enter the selected character. When one of the two characters of the outer and inner rows of indicia which are aligned with the pointer 118 is desired, the CONFIRMATION key 120 is operated, together with an OUT/IN selector key 125 (which will be described). As a result, the character of the outer or inner row of indicia selected by the OUT/IN selector key 125 is selected and entered as the desired character. The currently designated characters aligned with the pointer 118 are sequentially indicated on a liquid crystal display 122 provided on the data input section 110.

The data input section 110 further has various function keys 136 disposed adjacent to the character entry dial 116. The function keys 136 include a SPACING selector key 124 for designating the spacing between successive characters to be printed, a SIZE selector key 126 for designating the size of the character, the above-indicated OUT/IN selector key 125, an INSERT key 128, a DELETE key 130, a KANA/CHINESE CHARACTER conversion key 132 for converting an entered "kana" word into a Chinese character word, a SEARCH key 134 for searching and designating a desired Chinese character or word, and a PRINT key 135 for effecting the printing of the entered data.

There will next be described in detail the character entry dial 116 and the CONFIRMATION key 120.

Figure 5:
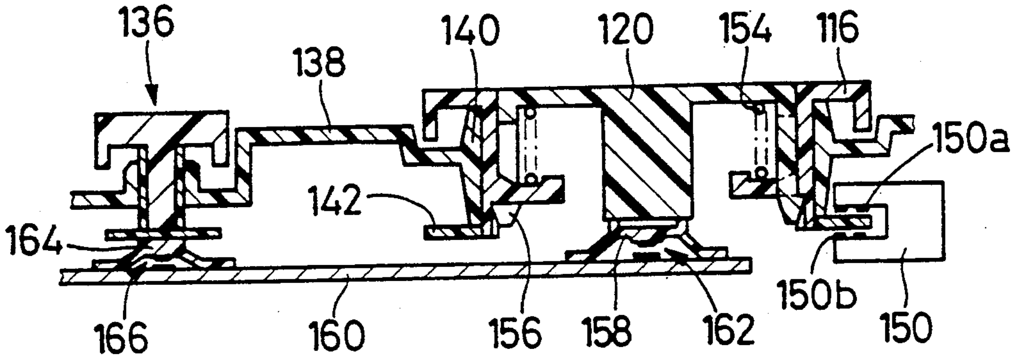
FIG. 5 is an elevational view in cross section of a character entry dial and its vicinity.

As shown in FIG. 5, the character entry dial 116 is rotatably supported within a cylindrical portion 140 of a covering 138 which forms a part of the apparatus body 112. The dial 116 has an upper operating portion which protrudes from the covering 138. A slit disc 142 is secured to the lower end of the character entry dial 116 such that the disc 142 is concentric with the dial 116.

Figure 6:
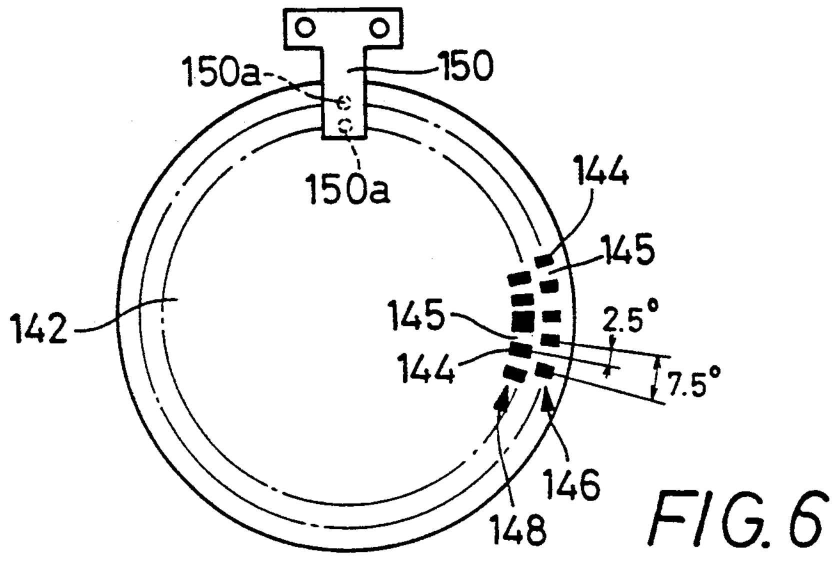
FIG. 6 is a fragmentary plan view of the arrangement of FIG. 5.
Figure 7:
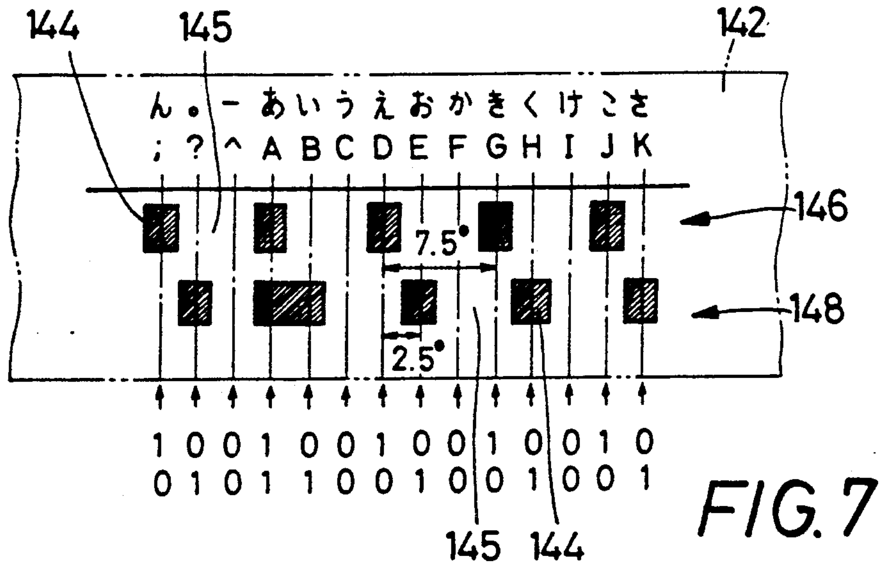
FIG. 7 is a schematic representation illustrating a portion of an optical grid arrangement of the character entry dial, when viewed linearly, in connection with the states of detection signals obtained by a photoelectric sensor.

As indicated in FIG. 6, the slit disc 142 has a circular optical grid arrangement formed by silk-screen printing. The optical grid arrangement has optically opaque grids 144, and optically transparent slits 145 formed between the adjacent opaque grids 144. A portion of this optical grid arrangement is illustrated in FIG. 7, in which actually circular outer and inner rows 146, 148 of the grids and slits 144, 145 are shown so as to extend linearly, for convenience' sake. The outer row 146 is adapted to detect the angular phase of the character entry dial 116, while the inner row 148 is adapted to detect the rotating direction of the dial 116. In the present embodiment, the grids 144 of the outer row 146 are evenly spaced apart from each other at an angular interval of 7.5°, and the grids 144 of the inner row 148 are offset from the corresponding grids 144 of the outer row 146 by an angle of 2.5° in the clockwise direction as viewed in FIG. 7. A photoelectric sensor 150 for optically detecting the grids and slits 144, 145 of the outer and inner rows 146, 148 is provided such that light-emitting elements 150*a* on one side of the sensor 150 and light-sensitive elements 150*b* on the other side of the sensor 150 are positioned on the opposite surfaces of the slit disc 142, as indicated in FIG. 5.

The photoelectric sensor 150 is adapted to produce a signal "1" for each grid 144, and a signal "0" for each 20, slit 145. These signals are applied to a microcomputer 274 of a control system of the instant tape printer, as described later in greater detail, by reference to FIG. 15. When the dial 116 is positioned such that the indicia "10·A" are aligned with the pointer 118 as indicated in FIG. 3, the states of the signals produced by the sensor 150 are "1" for both of the outer and inner rows 146, 148. This output "1, 1" of the sensor 150 is obtained only when the indicia "10·A" are aligned with the pointer 118. In this position, the dial 116 is zeroed. If the next output of the sensor 150 obtained by an incremental rotation thereof from this zero point is "0, 0", this indicates that the dial 116 has been rotated in the clockwise direction as viewed in FIG. 3. If the next output is "0, 1", on the other hand, this means that the dial 116 has been rotated in the counterclockwise direction. Thus, the rotating direction of the dial 116 can be determined. Further, the angular phase of the dial 116 and therefore the indicia (characters) aligned with the pointer 118 can be determined by counting the pulse signals from the sensor 150 which correspond to the grids 144 and slits 145 on the slit disc 142.

As shown in FIG. 5, the CONFIRMATION key 120 is fitted in the annular character entry dial 116 such that the key 120 is axially slidable relative to the dial 116. While the key 120 is biased by a spring 154 in a direction that causes the key 120 to protrude from the dial 116, the key 120 is held in position by abutting contact of a tab 156 of the key 120 with the lower end portion of the dial 116. The CONFIRMATION key 120 has an elastically yieldable rubber contact plate 158 fixed to its lower end. A contactor 162 is diposed on a baseplate 160 of the data input section 110, such that the contactor 162 is located right below a central portion of the contact plate 158. The contact plate 158 also serves as a dust boot surrounding the contactor 162, and is rotatable while its lower end is held in contact with the surface of the baseplate 160. The function keys 136 indicated above have a construction similar to that of the CONFIRMATION key 120. Each function key 136 has a contactor 166 disposed between a corresponding contact plate 164 and the baseplate 160, so as to produce a signal when operated.

Referring back to FIG. 3, the printing section 114 is covered by a transparent casing 169 which has an open and a closed position. This casing 169 constitutes a part of the apparatus body 112. In the printing section 114, a recording medium in the form of a substantially transparent tape 170 is fed leftward (as viewed in FIG. 3) in its longitudinal direction, along a predetermined feed path which defines a boundary between the data input and printing sections 110, 114 (front and rear sections). On this transparent tape 170, an image is printed by a recording device in the form of a thermal print head 172. This print head 172 has a row of heat-generating elements (not shown) which extends in a direction normal to the direction of feed of the tape 170. As shown in FIG. 4, the print head 172 is held in pressed contact with a medium feeding roller in the form of a platen roller 176, via the transparent tape 170 and a print ribbon 174 which has an inking material or ink composition. The platen roller 176 is supported rotatably about an axis which is parallel to the row of the heat-generating elements of the print head 172.

For the sake of description, it is assumed that the surface of the transparent tape 170 that is viewed in a direction A of FIG. 4 or on the operator's side is referred to as a front surface, while the surface of the tape 170 viewed in a direction B is referred to as a back surface. The print head 172 is located on the side facing the back surface of the transparent tape 170. With the appropriate heat-generating elements of the print head 172 energized so as to form a corresponding character pattern, the inking material in the corresponding local portions of the print ribbon 174 is transferred to the back surface of the transparent tape 170 while the tape 170 is fed in the leftward direction as seen in FIG. 3. In this manner, the image is printed on the back surface of the tape 170 such that the printed image as viewed in the direction B is laterally reversed with respect to a nominal desired image as viewed in the direction A.

It is noted that while the transparent tape 170 is fed leftward as viewed on the operator's side (in the direction A) as in an ordinary tape printer, the tape 170 is fed rightward as viewed in the direction B from the thermal head 172 toward the back surface of the tape 170. In this sense, the tape feeding direction as viewed from the thermal head 172 is different from the feeding direction in the ordinary tape printer.

A roll of the print ribbon 174 is accommodated in a ribbon cassette 178. More specifically, the print ribbon 174 is supplied from the roll mounted on a supply spool 180 in the ribbon cassette 178 as shown in FIG. 4, and is fed between the print head 172 and the platen roller 176. The used length of the print ribbon 174 is rewound on a take-up spool 182 in the ribbon cassette 178.

The transparent tape 170 is wound as a roll on a supply spool 190. As is apparent from FIG. 8, the supply spool 190 is fit on a spool shaft 192 and is rotatable with the spool shaft 192. Between this spool shaft 192 and a baseplate 193 of the printing section 114, there is disposed a spring washer 194 which applies a suitable amount of resistance to the rotation of the spool 190, whereby a free rotation of the roll of the transparent tape 170 is avoided. Alternative means for applying a resistance to the rotation of the supply spool 190 is illustrated in FIGS. 9 and 10. This alternative means employs a spiral spring 195 which is fixed at its one end to a fixed member 196. The other end of the spiral spring 195 is pre-loaded in pressed contact with the inner surface of a cylindrical portion 197 formed as an intergral part of the spool shaft 192. A friction force between the spiral spring 195 and the surface of the rotating cylindrical portion 197 provides a resistance to the rotating movement of the supply spool 190.

Figure 8:
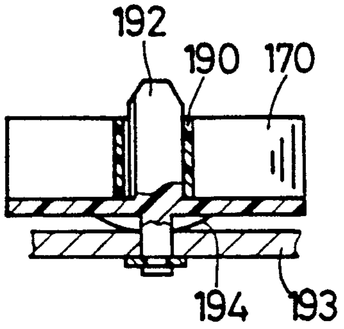
FIG. 8 is a cross sectional view taken along line 8—8 of FIG. 4.
Figure 9:
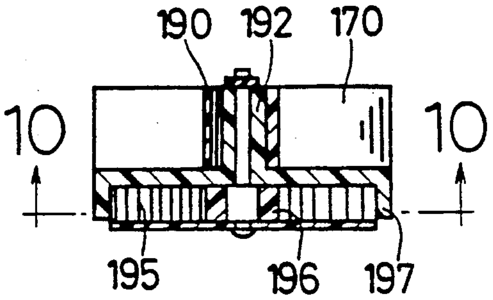
FIG. 9 is a cross sectional view showing a modification of the arrangement of FIG. 8.
Figure 10:
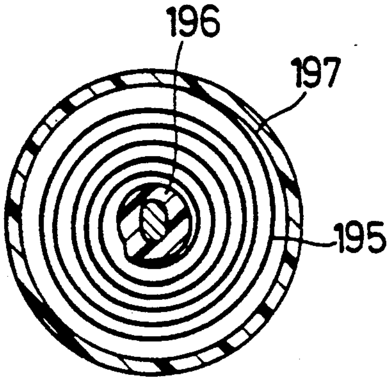
FIG. 10 is a cross sectional view taken along line 10—10 of FIG. 9.

In either of the two arrangements of FIG. 8 and FIGS. 9 and 10, the transparent tape 170 supplied from the supply spool 190 is turned by a guide roller 198 in its feed direction, and is passed between the print head 172 and the platen roller 176. The portion of the transparent tape 170 on which the printing is effected by the thermal head 172 is further fed between a pair of mutually adjacently located presser rollers 199, 200 disposed downstream of the print head 172. The two presser rollers 199, 200 define therebetween a pressure nip through which is passed the printed portion of the tape 170 which bears the laterally reversed image.

Figure 11:
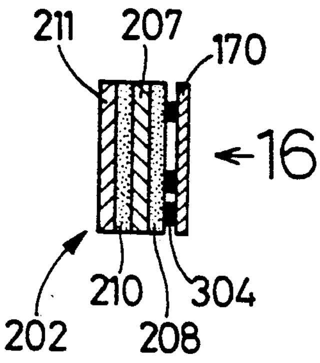
FIG. 11 is a cross sectional view showing a dry transfer tape produced by the tape printer, when operated in its first operating position.

A supply spool 204 is disposed on one of opposite sides of the ribbon cassette 178 which is remote from the supply spool 190 for the transparent tape 170. This supply spool 204 supports a roll of a covering tape 202 which includes a release layer 211 as shown in FIG. 11. The supply spool 204 is fit on a spool shaft 206 for rotation therewith. Like the supply spool 190 for the transparent tape 170, the supply spool 204 is given a resistance to its rotation, by a mechanism similar to that shown in FIG. 8 or 9, whereby a free rotation of the roll of the covering tape 202 is avoided. The covering tape 202 supplied from the spool 204 is fed between the presser rollers 199, 200, so that the covering tape 202 adheres to the back surface of the printed portion of the transparent tape 170.

As is apparent from FIG. 11, the covering tape 202 consists of a paper substrate 207, two adhesive layers 208, 210 formed on the opposite surfaces of the substrate 207, and the release layer 211 which covers the adhesive layer 210. The tape 202 is bonded at its adhesive layer 208 to the back surface of the printed portion of the tape 170, while the tapes 170, 202 are passed through the pressure nip of the presser rollers 199, 200.

The set of presser rollers 199, 200, and the platen roller 176 are selectively driven by a drive system, which will be described by reference to FIG. 12. Gears 212 and 214 are provided concentrically with the respective presser rollers 199, 200, so that the gears 212, 214 are rotated with the respective rollers 199, 200. The gears 212, 214 are arranged to be engageable with each other. The gear 214, and intermediate gears 216, 218 and 220 are rotatably supported on a gear lever 222, such that these gears 214, 216, 218, 220 establish a gear train wherein the gears mesh with each other in the order of description. A drive source in the form of a tape feeding motor 223 is provided such that a pinion 224 rotated by the motor 223 is held in mesh with the intermediate gear 216, and another intermediate gear 226 which in turn meshes with a take-up gear 228 for the ribbon cassette 178. The take-up gear 228 is provided in concentric relation with the spool drive shaft 184 indicated above, as shown in FIG. 13. The take-up spool 182 of the ribbon cassette 178 is fit on the spool drive shaft 184. The take-up gear 228 and the spool drive shaft 184 are rotatable relative to each other, namely, the gear 228 slips on the shaft 184, when a torque exceeding a given limit is applied to the gear 228.

Figure 12:
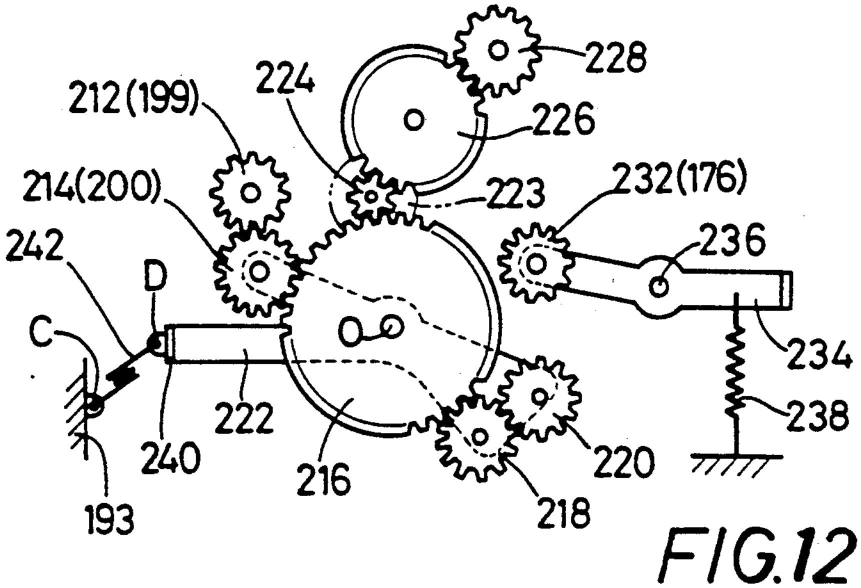
FIG. 12 is a view illustrating a drive system in the first operating position.
Figure 13:
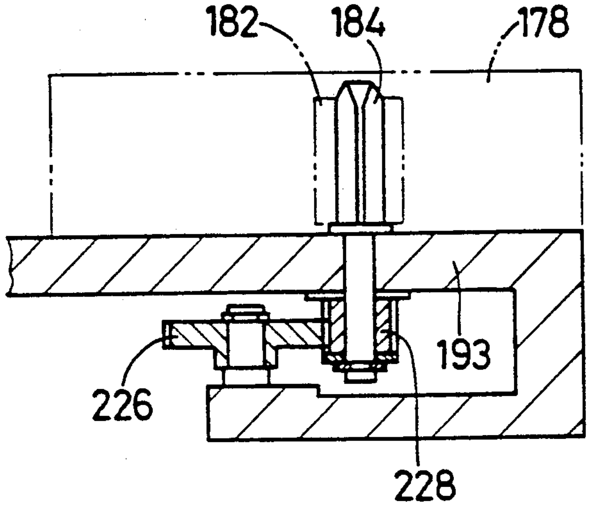
FIG. 13 is a fragmentary elevational view in cross section of the drive system of FIG. 12.

As shown in FIG. 12, a roller gear 232 is concentrically secured to the platen roller 176 of FIG. 4, for rotation therewith. This roller gear 232 is freely rotatably supported at one end of a platen roller lever 234. This lever 234 is pivotally supported at its intermediate portion by a vertically extending shaft 236, and is biased by a tension spring 238 in a direction that causes the platen roller 176 to be forced against the print head 172.

The above-indicated gear lever 222 is pivotable about an axis O which passes the center of the intermediate gear 216. The lever 222 has a first position of FIG. 12 in which the gear 214 on the lever 222 engages the gear 212. In this first position, the gear 220 on the lever 222 is disengaged from the roller gear 232 of the platen roller 176. From this first position, the gear lever 222 is pivoted counterclockwise to a second position of FIG. 14 in which the gear 214 is disengaged from the gear 212, while the gear 220 engages the gear 232 of the platen roller 176. The gears 212, 232 and the gear train 214, 216, 218, 220 are arranged so as to selectively establish the first and second positions of FIGS. 12 and 14, as described above.

The gear lever 222 has an operating portion 240 which extends upward from one end thereof through the covering 138 of the data input section 110 (FIG. 5). To the gear lever 222, there is connected a torsion spring 242 for maintaining the lever 222 selectively in one of the first and second positions described above.

This torsion spring 242 is installed in pre-loaded condition such that the one end is fixed to the baseplate 193 of the printing section 114, while the other end is fixed to the end of the lever 222 from which the operating portion 240 extends. The above-indicated one end of the torsion spring 242 serves as a proximal or base end indicated at C in FIG. 12, while the other end serves as a distal or operating end indicated at D in FIG. 12. In the first position of FIG. 12, the operating end D of the torsion spring 242 is located on one of opposite sides of a straight line C-O (connecting the base end C and the pivot axis O of the lever 222), which one side is adjacent to the gear 212. The gear lever 222 is held in this first position under the clockwise biasing action of the spring 242. In the second position of FIG. 14, the operating end D of the torsion spring 242 is located on the other side of the straight line C-O remote from the gear 212. The lever 222 is held in this second position under the counterclockwise biasing action of the spring 242.

In the present embodiment, the tape feeding motor 223 serves as a drive source for both the tape feeding means and the ribbon feeding means. In the first position of the gear lever 222, the presser rollers 199, 200 driven by the respective gears 212, 214 serve as the feed rollers for feeding the transparent tape 170. In the second position of the gear lever 222, the platen roller 176 driven by the gear 232 serves as the feed roller for the tape feeding means. The path along which the transparent tape 170 supplied from the supply spool 190 is fed is defined by the guide roller 198, print head 172, platen roller 176 and presser rollers 199, 200. Further, it will be understood that the gear lever 222 supporting the gears 214, 216, 218, 220 and provided with the operating portion 240, cooperates with the torsion spring 242 to provide a switching device for selectively establishing the operating positions of the drive system of FIGS. 12 and 14, which correspond to the first and second positions of the lever 222.

Figure 15:
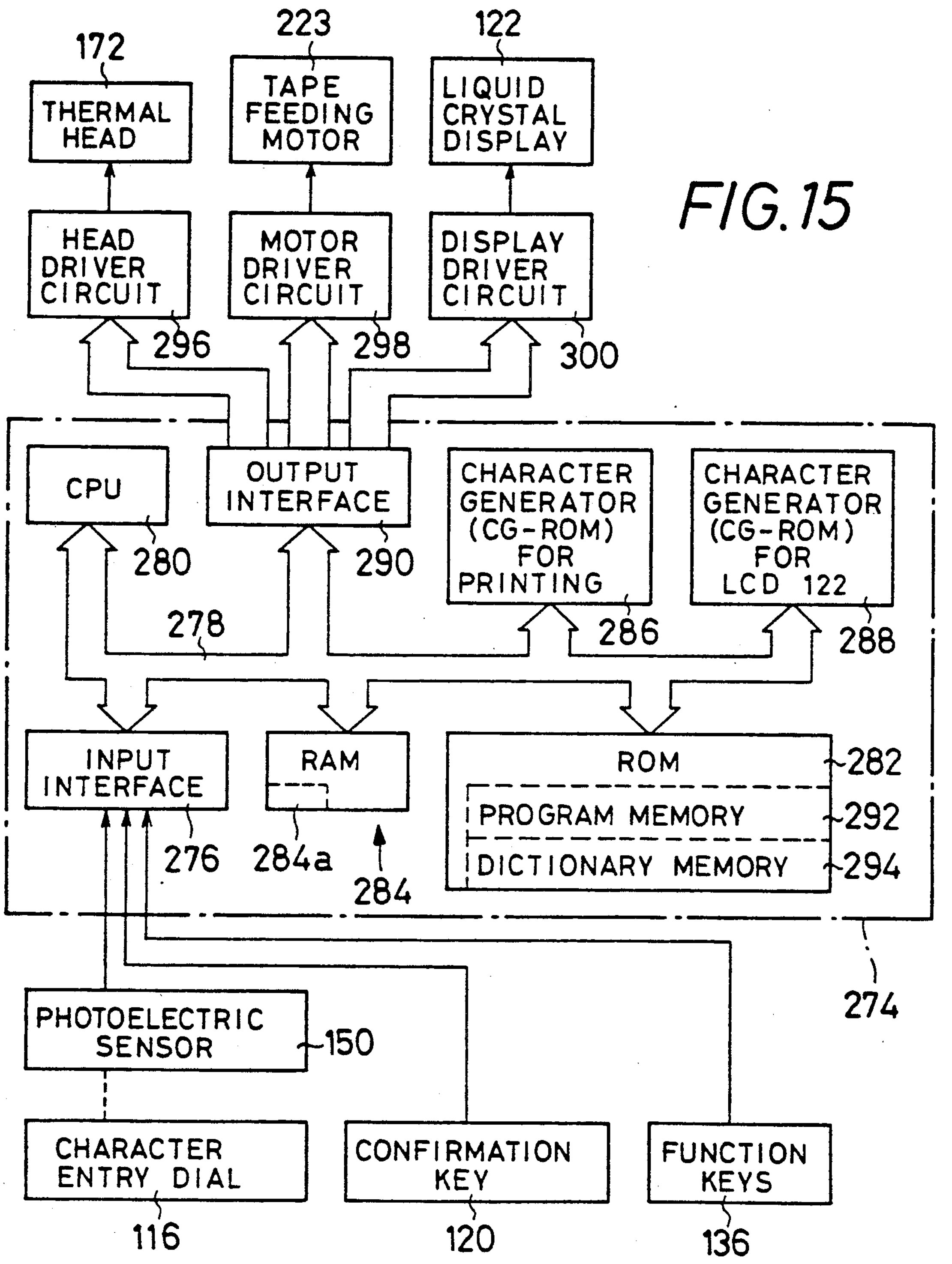
FIG. 15 is a schematic block diagram showing a control system of the tape printer of FIG. 3.

Referring next to the block diagram of FIG. 15, there is illustrated a control system for controlling the data input section 110 and printing section 114.

The photoelectric sensor 150 for detecting the angular position of the character entry dial 116, the CONFIRMATION key 120 for confirming the character selected by the dial 116, and the various function keys 136 are connected to an input interface 276 of the above indicated microcomputer 274. The input interface 276 is connected through a bus line 278 to a CPU (central processing unit) 280, a ROM (read-only memory) 282, a RAM (random-access memory) 284, character generators (hererinafter referred to as "CG-ROM") 286, 288, and an output interface 290.

The ROM 282 includes a PROGRAM memory 292 which stores a control program for controlling the operation of the instant tape printer, and a DICTIONARY memory 294 used for converting the "kana" words into the Chinese character words. The RAM 284 has various counters, registers and buffer memories. The CG-ROM 286 generates dot-matrix character patterns for printing characters, based on entered coded character data, and the CG-ROM 288 generates dot-matrix character patterns for displaying the characters on the liquid crystal display 122. To the output interface 290, there are connected a head driver circuit 296, a motor driver circuit 298 and a display driver circuit 300, which are connected to the print head 172, tape feeding motor 223 and liquid crystal display 122, respectively.

As described above, the print head 172 is disposed in the rear section of the apparatus body 112, such that the heat-generating elements of the head 172 face the back surface of the transparent tape 170. The transparent tape 170 is fed in the leftward direction as viewed in FIG. 3. However, the tape 170 is fed in the rightward direction when viewed in the direction from the print head 172 toward the back surface of the tape 170. Therefore, the dot-matrix character pattern data is read out from the CG-ROM 286 in the same order as in an ordinary thermal printer. Namely, the dot-matrix data sets for each character are read out, beginning with the data set representative of the leftmost column of the character, whereby the heat-generating elements of the print head 172 are selectively energized according to the dot-matrix data sets. As a result, an appropriate image is printed on the back surface of the transparent tape 170 (which faces the print head 172), such that the printed image as viewed in the direction B of FIG. 4 is laterally reversed with respect to a nominal desired image as viewed in the direction A of FIG. 4. Although the dot-matrix pattern data per se fed to the print head 172 and the order of reading of the data are the same as in an ordinary thermal printer for printing the nominal image (non-reversed image), the image printed by the print head 172 is laterally reversed, since the direction of feed of the tape 170 as viewed on the side of the print head 172 is reversed with respect to the tape feeding direction in the ordinary thermal printer. In the present embodiment, the CPU 280 constitutes a major portion of the control device for controlling the reverse printing of characters on the back surface of the tape 170.

There will next be described the operating of the instant tape printer.

After the tape printer is turned on, the character entry dial 116 is zeroed by pressing the CONFIRMATION key 120 while the indicia "10·A" on the dial 116 are aligned with the pointer 118. Subsequently, the CPU 280 processes various signals To enter each desired character, the dial 116 is rotated to the appropriate angular position, and the OUT-/IN selector key 125 is operated to designate one of the two rows of indicia in which the appropriate character indium is provided. Then, the CONFIRMATION key 120 is operated. As a result, the corresponding character data is fed to the microcomputer 274. The selected character aligned with the pointer 118 is displayed on the liquid crystal display 122, via the CG-ROM 288. Simultaneously, the dot-matrix character pattern data of the character to be printed is generated from the CG-ROM 286 and is stored in a print buffer 284*a* of the RAM 284. Upon operation of the PRINT key 135, the dot-matrix character pattern data is retrieved from the print buffer, and fed to the print head 172, whereby the corresponding image is printed on the transparent tape 170 such that the printed image as viewed in the direction B of FIG. 4 is laterally reversed to the nominal image as viewed in the direction A of the same figure. Since the operator sees the printed image as the normal nominal image, the operator can easily confirm the printed image.

Figure 14:
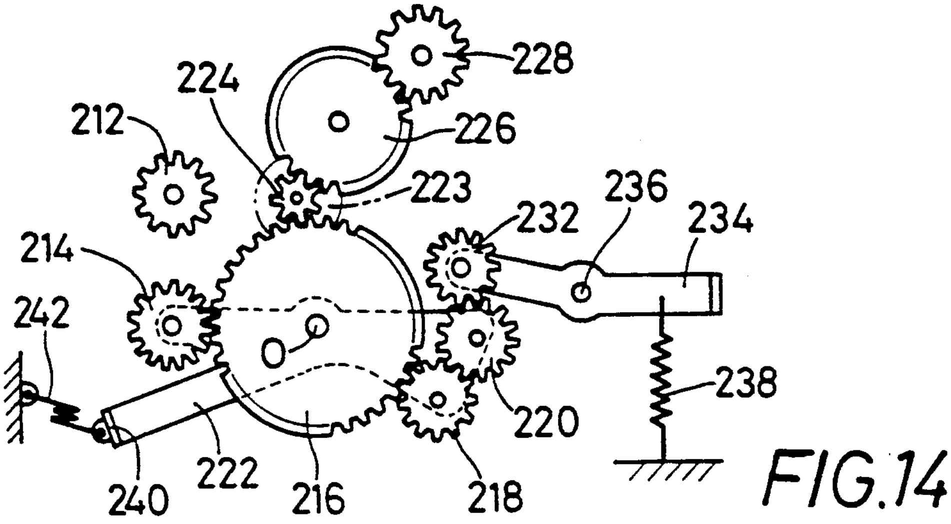
FIG. 14 is a view illustrating the drive system in the second operating position.

Prior to the printing operation indicated above, the drive system for feeding the transparent tape 170 is selectively placed in one of the first and second positions of FIGS. 12 and 14, depending upon whether the printed tape 170 is covered by the covering tape 202 or not.

When it is desired to cover the printed back surface of the transparent tape 170 with the covering tape 202, the gear lever 222 is set to the first position of FIG. 12, in which the gear 214 meshes with the gear 212. In this first position, the presser rollers 199, 200 are held in pressed contact with each other, while the intermediate gear 220 is disengaged from the roller gear 232.

As a result, the drive force of the tape feeding motor 223 is transmitted to the gears 214, 212 through the intermediate gear 216, whereby the presser rollers 199, 200 are rotated in the opposite directions while sandwiching the transparent tape 170. Accordingly, the tape 170 is pulled from the supply spool 190, and is fed past the print head 172 in timed relation with the printing action of the head 172. At the same time, the covering tape 202 is pulled from the supply spool 204. The platen roller 176 which is disconnected from the motor 223 is in pressed contact with the print head 172 via the tape 170 under the biasing action of the tension spring 238, whereby the platen roller 176 is rotated due to a friction force between the roller 176 and the tape 170 being fed. As indicated in FIG. 3, the presser roller 199 has guide flanges 199*a*, 119*b* at its upper and lower ends, which serve to guide the tapes 170, 202, such that the upper and lower edges of the tapes 170, 202 contact the flanges. Thus, the tapes 170, 202 can be properly positioned in the direction of width. The circumferential surface between the two flanges of the presser roller 199 cooperates with the other presser roller 200 to nip and feed the tapes 170, 202.

Figure 16:
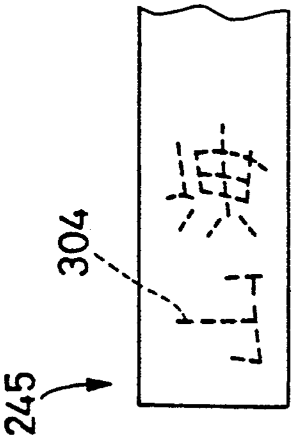
FIG. 16 is a view taken in a direction of arrow 16 of FIG. 11.

The presser rollers 199, 200, which serve to feed the tapes 170, 202, also function as a major part of the covering device for backing or covering the printed tape 170 with the covering tape 202. Described more specifically, the transparent tape 170 and the covering tape 202 are superposed on each other by the rotating movements of the presser rollers 199, 200, and the covering tape 202 is bonded at its adhesive layer 208 to the printed back surface of the tape 170, through the aid of a pressure applied to the tapes 170, 202 from the rollers 199, 200 which are rotated in pressed rolling contact with each other under the biasing action of the torsion spring 242 (FIG. 12). Thus, a multi-layered tape indicated at 245 in FIG. 3 and FIG. 16 is produced. The laterally reversed image printed on the back surface of the tape 170 is indicated at 304 in FIG. 16. This image 304 is seen through the transparent tape 170 as the desired nominal image when viewed in the direction of arrow 16 of FIG. 11, as indicated in FIG. 16 by way of example. The produced multi-layered tape 245 is cut by a suitable cutter mechanism 244 into segments. These segments may be bonded at the adhesive layer 210 to a desired member, after the release layer 211 is removed.

It will be understood that the transparent tape 170 serves as a recording medium for bearing the image 304. Further, while the transparent tape 1, 170 is fed by the presser rollers 199, 200, the covering tape 202 serves as a tape for preventing the surface of the presser roller 199 from directly contacting the printed image 304 and protecting the image 304 from rubbing.

Where the printed transparent tape 170 is not covered or backed by the covering tape 202, the drive system for feeding the tape 170 is placed in the second position of FIG. 14. When the gear lever 222 is pivoted in the counterclockwise direction to the second position of FIG. 14, the presser rollers 199, 200 are spaced apart from each other. In this second position of FIG. 14, the gear 214 is disengaged from the gear 212 while the rollers 199, 200 are held apart from each other. At the same time, the intermediate gear 220 is in mesh with the gear 232 of the platen roller 176.

Figure 17:
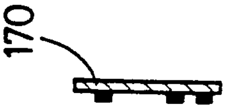
FIG. 17 is cross sectional view of the dry transfer tape produced by the tape printer when operated in its second operating position.

With the drive system placed in the second position of FIG. 14, the rotary movement of the tape feeding motor 223 is transmitted to the platen roller gear 232 via the intermediate gears 216, 218 and 220, whereby the platen roller 176 is rotated in the counterclockwise direction as viewed in FIG. 4. Accordingly, the transparent tape 170 is fed by the platen roller 176 in the longitudinal direction, while the thermal print head 172 effects reverse printing on the transparent tape 170, as indicated in FIG. 17. Since the overall speed reduction ratio of the gear train between the pinion 224 of the motor 223 and the gear 232 is equal to that of the gear train between the pinion 224 and the gears 214, 212, the tape feeding speed in the second position of the drive system is equal to that in the first position.

The printed length of the transparent tape 170 is passed between the presser rollers 199, 200. In the second position, however, the printed tape 170 is not fed by these rollers, since the roller 199 is disconnected from the motor 223 and the rollers 199, 200 are separated from each other. Further, the printed image on the tape 170 will not be rubbed, erased or otherwise influenced by the rollers 199, 200.

Like the multi-layered tape 245, the printed tape 170 is cut into segments by a suitable cutter as indicated at 244 in FIG. 4. The cut segments obtained from the printed tape 170 can be used as dry transfer sheets to transfer the printed image to a desired image receptive member. Namely, the back surface of the segment bearing the laterally reversed image (as viewed toward the back surface) is forced into contact with the object surface, with a finger pressure applied to the ink material of the image through the segment (170), whereby the image can be transferred to the image receptive member. The transferred image is viewed as the desired nominal image. Thus, the cut segment can be conveniently used for a lettering work. The multi-layered tape 245 produced in the first position of FIG. 12 is applied by bonding to the object and may be considered an adhesive tape having a printed image, while the single-layer tape 170 produced in the second position of FIG. 14 may be considered a dry transfer or decalcomania tape from which the printed image is transferred under pressure to a desired member. Generally, it is desirable that the ink material of the print ribbon 174 used for the single-layer dry transfer tape 170 have a higher degree of transferability, than the ink material for the multi-layered adhesive tape 245. In this case, the ribbon cassette 178 is also changed to use another type of print ribbon 174, when the transparent and covering tapes 170, 202 are replaced by another type of transparent tape 170 upon changeover of the tape drive system from the first position to the second position. To further facilitate the transfer of the ink material from the printed tape 170 (produced in the second position) to the object surface, it is preferable that the wettability of the surface of the transparent tape 170 used in the second position be relatively low.

The pinion 224 of the motor 223 is always held in mesh with the take-up gear 228 through the intermediate gear 226, irrespective of whether the drive system is placed in the first position of FIG. 12 or in the second position of FIG. 14. Consequently, the used print ribbon 174 is separated from the printed transparent tape 170, by the rotation of the spool drive shaft 184, and is wound on the take-up spool 182.

When the supply spool 190 is removed and mounted to change the transparent tape 170 from one type for the multi-layered tape 245, to another type for the dry transfer tape, the platen roller lever 234 (FIGS. 12 and 14) is pivoted in the counterclockwise direction against the biasing force of the tension spring 238, so as to produce a gap between the platen roller 176 and the print head 172. In this condition, the transparent tape 170 extending from the supply spool 190 can be readily removed from between the roller and head 176, 172 or passed therebetween. When the supply spool 204 is removed, the gear lever 222 is moved to the second position of FIG. 14, in which the presser rollers 199, 200 are spaced apart from each other. In this condition, the covering tape 202 extending from the supply spool 204 can be readily removed from between the rollers 199, 200.

While the transparent tape 1, 170 is used as a recording medium in the illustrated embodiments, it is possible to use a colored semi-transparent tape or other recording medium which permits a printed image on its back surface, to be seen through its thickness on the side of the front surface.

Further, the covering tape 202 of FIG. 11 may be replaced by a tape 211 which has a single adhesive layer 208 on a release layer. Namely, the substrate 207 and adhesive layer 210 may be eliminated from the tape 202 of FIG. 11. Furthermore, the adhesive layer 208 may be replaced by a layer which is softened under heat and thereby bonded to the transparent tape 170.

In the illustrated embodiment described above, the platen roller 176 is operable to serve as means for feeding the tape 170. However, this roller 176 may be used solely as a platen for supporting the tape 170, and exclusive tape feed rollers may be provided downstream of the roller 176. In this case, the tape feed rollers are rotated only when the tape drive system is placed in the second position of FIG. 14. Similarly, the presser rollers 199, 200 may be used solely as a device for bonding the covering tape 202 to the printed tape 170, and exclusive feed rollers may be provided downstream of the rollers 199, 200.

Figure 18:
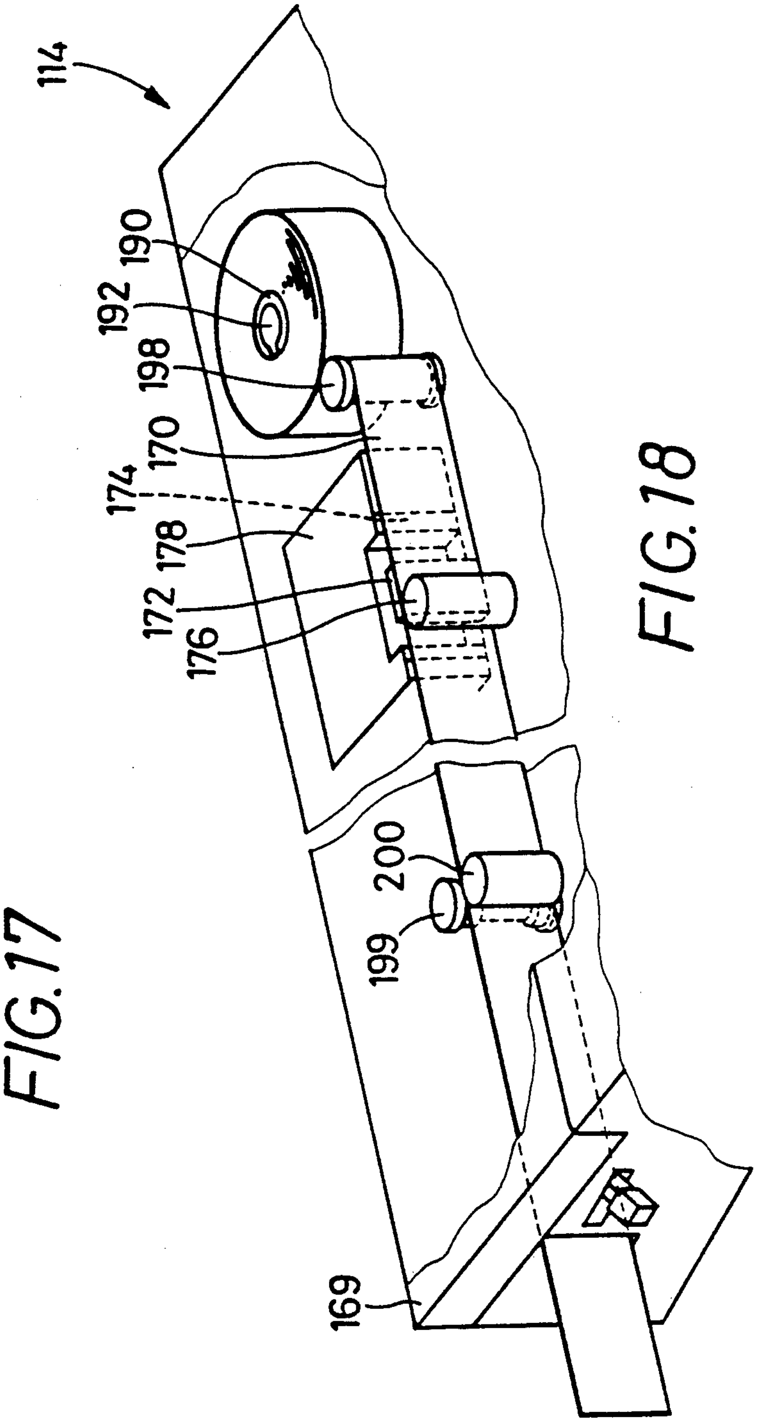
FIG. 18 is a fragmentary perspective view showing a further embodiment of the invention.

Further, the presser roller 199 may have an axially intermediate portion which has a smaller diameter than the opposite end portions, like the small-diameter portion 12 or portions 12' of the driving feed roller 8 of the embodiments of FIGS. 2 and 2A, so that the presser roller 199 is prevented from contacting the printed image on the surface of the transparent tape 170. In this case, the presser rollers 199, 200 need not be spaced apart from each other even when the printing is effected with the drive system placed in the second position of FIG. 14, namely even when the printed tape 170 is not covered by the covering tape 202. In this feeding arrangement, the tape 170 is fed not only by the platen roller 176 but also by the presser rollers 199, 200, and is therefore effective where there exists a considerable distance in the feeding direction between the platen roller 176 and the end of the printer from which the printed tape 170 is fed out, as indicated in FIG. 18.

While the present invention has been described in its presently preferred embodiments, it is to be understood that the invention may be embodied with various changes, modifications and improvements, which may occur to those skilled in the art.

What is claimed is:

1. A printing apparatus for printing on a recording tape in a printing direction parallel to a longitudinal direction of said tape, comprising:
   a platen roller rotatable about an axis perpendicular to said printing direction;
   a print head for printing characters on said recording tape according to input data such that said tape is held in contact with said print head and said platen roller;
   a covering tape supply device for delivering a covering tape for covering one of opposite surfaces of said recording tape on which printing is effected by said print head;
   a pair of presser rollers for superposing the covering tape delivered by said covering tape supply device, on a printed length of said recording tape, so as to cover said one surface of the recording tape, said pair of presser rollers defining therebetween a pressure nip through which are passed said covering tape and said printed length of said recording tape which have been superposed on each other, for securing said covering tape to said printed length of the recording tape; and
   a drive device for rotating at least one of said pair of presser rollers for feeding said covering tape and said printed length of the recording tape in said longitudinal direction.

2. A printing apparatus according to claim 1, further comprising a ribbon supply device for delivering a print ribbon such that said print ribbon is positioned between said recording tape and said print head and is fed together with said recording tape in said longitudinal direction.

3. A printing apparatus according to claim 1, wherein said print head consists of a thermal print head having heatgenerating elements which are selectively energized according to said input data.

4. A printing apparatus for printing on a recording tape in a predetermined printing direction, comprising:
   a platen roller rotatable about an axis perpendicular to said printing direction;
   a print head for printing on said recording tape such that said tape is held in contact with said print head and said platen roller; and
   a platen-roller drive device for rotating said platen roller for feeding said recording tape in said printing direction;
   a covering tape supply device for delivering a covering tap for covering one of opposite surfaces of said recording tape on which printing is effected by said printhead;
   a pair of presser rollers having an operated position in which said presser rollers define therebetween a pressure nip through which are passed said covering tape and a printed length of the recording tape so that the covering tape is secured to said one surface of the printed length of the recording tape, and a non-operated position in which said presser rollers are spaced apart from each other;
   a presser-roller drive device for driving said pair of presser rollers for feeding said recording tape in said printing direction;
   a drive source; and
   a drive control device connected to said drive source and said platen-roller drive device and said presser-roller drive device, for selectively operating said platen-roller drive device and said presser-roller drive device, said drive control device including switching means which is selectively placed in a first position for operatively connecting said drive source to said platen roller and placing said presser rollers in said non-operated position for preventing said covering tape from being secured to said recording tape, and a second position for operatively connecting said drive source to said pair of presser rollers and placing said presser rollers in said operated position for allowing said covering tape to be secured to said recording tape.

5. A printing apparatus for printing on a recording tape in a predetermined direction, comprising:

a platen roller rotatable about an axis perpendicular to said printing direction;

a print head for printing on said recording tape such that said tape is held in contact with said print head and said platen roller;

a platen-roller drive device for rotating said platen roller for feeding said recording tape in said printing direction;

a covering tape supply device for delivering a covering tape for covering one of opposite surfaces of said recording tape on which printing is effected by said print head;

a pair of presser rollers for superposing the covering tape delivered by said covering tape supply device, on a printed length of said recording tape, so as to cover said one surface of said recording tape, said pair of presser rollers defining therebetween a pressure nip through which are passed said covering tape and said printed length of said recording tape which have been superposed, whereby said covering tape and said printed length of the recording tape are secured to each other;

a presser-roller drive device for driving at least one of said pair of presser rollers for feeding said recording tape in said printing direction; and a drive control device connected to said platen-roller drive device and said presser-roller drive device, for selectively operating said platen-roller drive device and said presser-roller drive device.

6. A printing apparatus according to claim 5, wherein said pair of presser rollers have an operated position in which said pressure nip is established, and a non-operated position in which said pressure rollers are spaced apart from each other, and said platen-roller drive device and said presser-roller drive device comprises a common drive source, said drive control device comprising switching means which is selectively placed in a first position for operatively connecting said common drive source to said platen roller and placing said presser roller in said non-operated position for preventing said covering tape from being secured to said recording tape and a second position for operatively connecting said common drive source to said presser rollers and placing said presser rollers in said operated position for allowing said covering tape to be secured to said recording tape.

* * * * *